Patented Nov. 1, 1949

2,486,601

UNITED STATES PATENT OFFICE 2,486,601

PROCESS OF PRODUCING A MOLDING POWDER

Jesse M. Irwin, Dallas, Tex.

No Drawing. Application April 27, 1946,
Serial No. 665,616

5 Claims. (Cl. 106—163)

This invention relates to a process of producing molding powders from any ligno-cellulosic material such as wood, bagasse, straw, corn cobs and corn stalks.

The principal object of this invention is a process of providing by virtue of a series of novel steps, a plastic powder capable of being molded dry and with or without addition of accelerators or additives, in the presence of heat and under pressure to form blocks, slabs, plates, bars, and various other shapes of high strength and other desirable qualities. Bodies formed from the molding powder, under the herein described process, find wide usage in building and other fields in view of their durability and economy of manufacture combined with the fact that the appearance is pleasing and the surface thereof highly receptive to various forms of decoration.

Another object of the invention a process of providing a molding powder processed from natural ligno-celluloses in the form of blocks, chunks, or small particles, which are subjected to the action of sulphur which in the presence of steam under pressure and the degradation products of cellulose hydrolyzed in the process is converted to a hydrogen compound or compounds which react with portions of the degradation products of celluloses to form resinous products which in increasing the resin content of the mass renders it more thermo-plastic. In carrying out the process subsequent to the initial application of steam pressure, steam and volatiles are relieved from the digester and the steam pressure is reapplied and held for a predetermined period of time during which hydrogen-sulphur compounds and resinous products are formed whereupon the material is removed from the digester. After having been dried, the product is ground to a fineness according to the end product desired and the resultant powder is then molded at pressures from 500 to 4000 pounds per square inch at temperatures of 250 to 450 degrees F. for a predetermined period of time according to the density desired in the molded product.

The following are examples of two variations of the process showing different combinations of time in the digester, fineness of ground material, and molding pressures to give products of different density and appearance:

*Example 1.*—Hardwood was placed in a digester with sulphur in a ratio of 1 pound of sulphur to 40 pounds of wood and water in ratio of 2 pounds of water to 1 pound of wood. The digester was then heated until steam pressure was from 150 to 200 pounds per square inch, the temperature was 198° C. (388° F.) held for five minutes and the pressure relieved, carrying off steam and all such volatiles as were gassified at that temperature. Steam pressure was then restored to 200 pounds pressure per square inch and held for 20 minutes. The material was then removed from the digester and dried and subsequently ground to pass a 40-mesh screen.

The resultant powder was molded at a pressure of 4000 pounds per square inch at a temperature of 300° F. for five minutes to give a shaped article of dark brown to black in color, with high strength and a density of 1.44.

*Example 2.*—Hardwood in the form of chunks was placed in the digester with sulphur in the ratio of 1 pound of sulphur to 40 pounds of wood, and water in the ratio of 2 pounds of water to 1 pound of wood. The digester was then heated until steam pressure was from 150 to 200 pounds per square inch, temperature 198° C. (388° F.), and held for five minutes. The steam pressure was then relieved, carrying off all such volatiles as were gassified at this temperature. Steam pressure was then brought back up to 160 pounds per square inch, temperature 188° C. (370° F.) and held for 20 minutes. The material was then removed from the digester and dried and subsequently ground to a fine fibrous condition.

The fibrous material and the powders resulting from the grinding were molded at 800 pounds per square inch and at temperature of 188° C. (365° F.) for five minutes to give a high strength slab, light brown in color and with a specific gravity of 1.12.

It is obvious from the foregoing that there is nothing in the process nor in the materials employed which would require any unusual, complicated or expensive equipment for carrying out the same yet the ultimate gain is a product of unusual strength and durability having a wide range of uses.

Manifestly, the steps of the process as well as proportions, temperatures and pressures used are considered subject to minor variation without departing from the spirit and intent of the invention as set forth in the following claims.

What is claimed is:

1. The hereindescribed process of producing a plastic powder, characterized by initially subjecting natural ligno-cellulose to the action of a digester in the presence of water, and sulphur, in the proportion of one pound of sulphur to 40 pounds of the ligno-cellulose at a temperature of 366° to 388° F. under a pressure of 150 to 200 pounds per square inch; in maintaining said temperature and pressure for a period of five minutes, in releasing said pressure and discharging volatiles vaporizing at said temperature, in reheating the digester to obtain a pressure of 120 to 200 pounds per square inch, in maintaining said pressure for a period of 20 minutes, in removing said ligno-cellulose from the digester and drying and finally grinding the product to pass a 40 mesh screen.

2. The process of producing plastic powder consisting initially in digesting natural ligno-celluloses in the presence of water, and in the proportion of one pound of sulphur to 40 pounds of the ligno-cellulose at a temperature of 388° F. under pressure of 200 pounds per square inch, in relieving the pressure after five minutes and dissipating accumulated volatile gases, in again subjecting the product to a pressure of 150 pounds per square inch for another period of 20 minutes, in drying the produce and finally in grinding the resultant dried product to a powder.

3. The process of producing a plastic powder characterized by initially digesting natural ligno-cellulose in water with sulphur in the proportion of one pound of sulphur to forty pounds of the ligno-cellulose, and water in the presence of heat and pressure for five minutes, in relieving the pressure and discharging accumulated volatiles, in reapplying 150 pounds pressure for another period of 20 minutes, in drying the material and finally in grinding the dried product.

4. The process of producing reconstituted ligno-cellulose molding powder characterized by initially subjecting natural ligno-cellulose to heat and pressure in a digester in the presence of water, and sulphur in the proportion of one pound of sulphur to 40 pounds of the ligno-cellulose, in relieving the pressure to dissipate volatiles, in reheating the digester for another period of 20 minutes, in removing the material from the digester for drying and finally in pulverizing the dried product.

5. The process of producing a molding powder characterized by placing ligno-cellulose materials in a digester with water and sulphur in the proportions of one pound of sulphur to 40 pounds of the ligno-cellulose, in heating the digester to raise steam pressure to 200 pounds per square inch and temperature to 388° F. to gassify volatiles, in relieving steam pressure to carry off said volatiles, in reheating said digester for a period of 20 minutes to raise steam pressure to 150 pounds per square inch to affect hydrolysis of the ligno-cellulosic material, in removing said material from the digester for drying, and finally, in grinding the material to fineness desired.

JESSE M. IRWIN.

REFERENCES CITED

The following references are of record in the file of this patent:

UNITED STATES PATENTS

| Number | Name | Date |
|---|---|---|
| 665,229 | Kelly | Jan. 1, 1901 |
| 1,832,807 | Ellis | Nov. 17, 1931 |
| 1,939,404 | Nagelvoort | Dec. 17, 1933 |
| 2,283,820 | Schorger | May 19, 1942 |

FOREIGN PATENTS

| Number | Country | Date |
|---|---|---|
| 157,415 | Great Britain | Aug. 9, 1919 |
| 177,271 | Switzerland | May 31, 1935 |